Jan. 15, 1963
O. W. GREENE ETAL
3,073,402
PHOTOELECTRICALLY CONTROLLED APPARATUS AND
METHOD FOR BLENDING FIBRES
Filed June 8, 1953
6 Sheets-Sheet 1
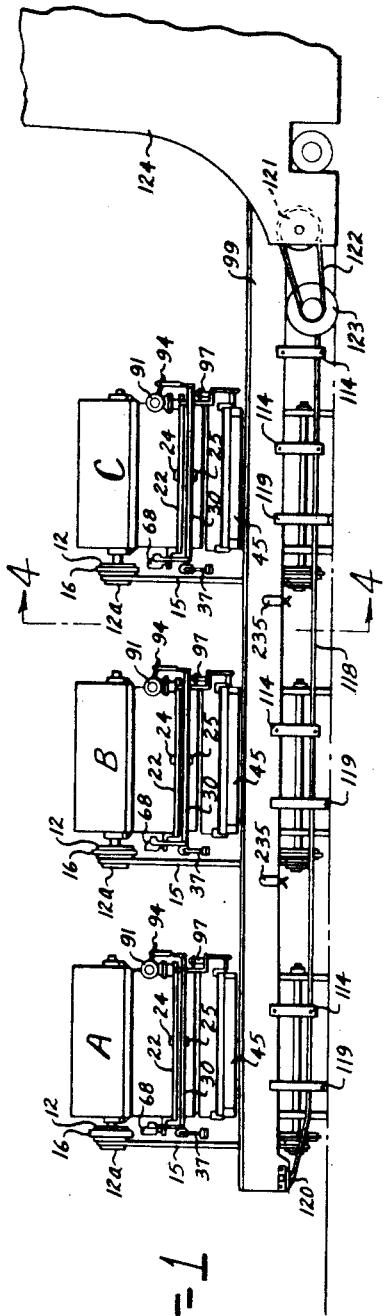
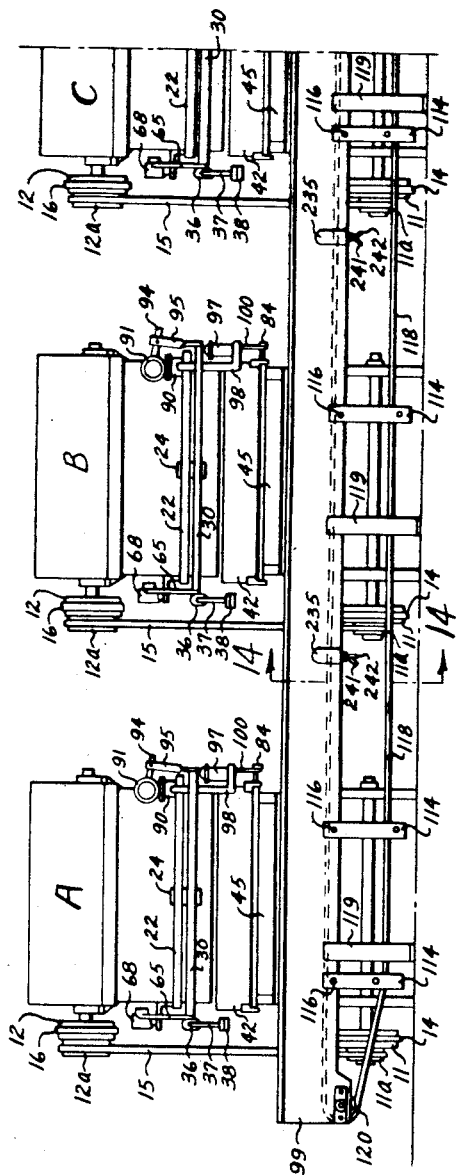
INVENTORS:
OREN W. GREENE,
ROBERT W. TWITTY &
THERMAN L. RICHIE.
BY
RICHEY, WATTS, EDGERTON,
McNENNY & FARRINGTON.
ATTORNEYS

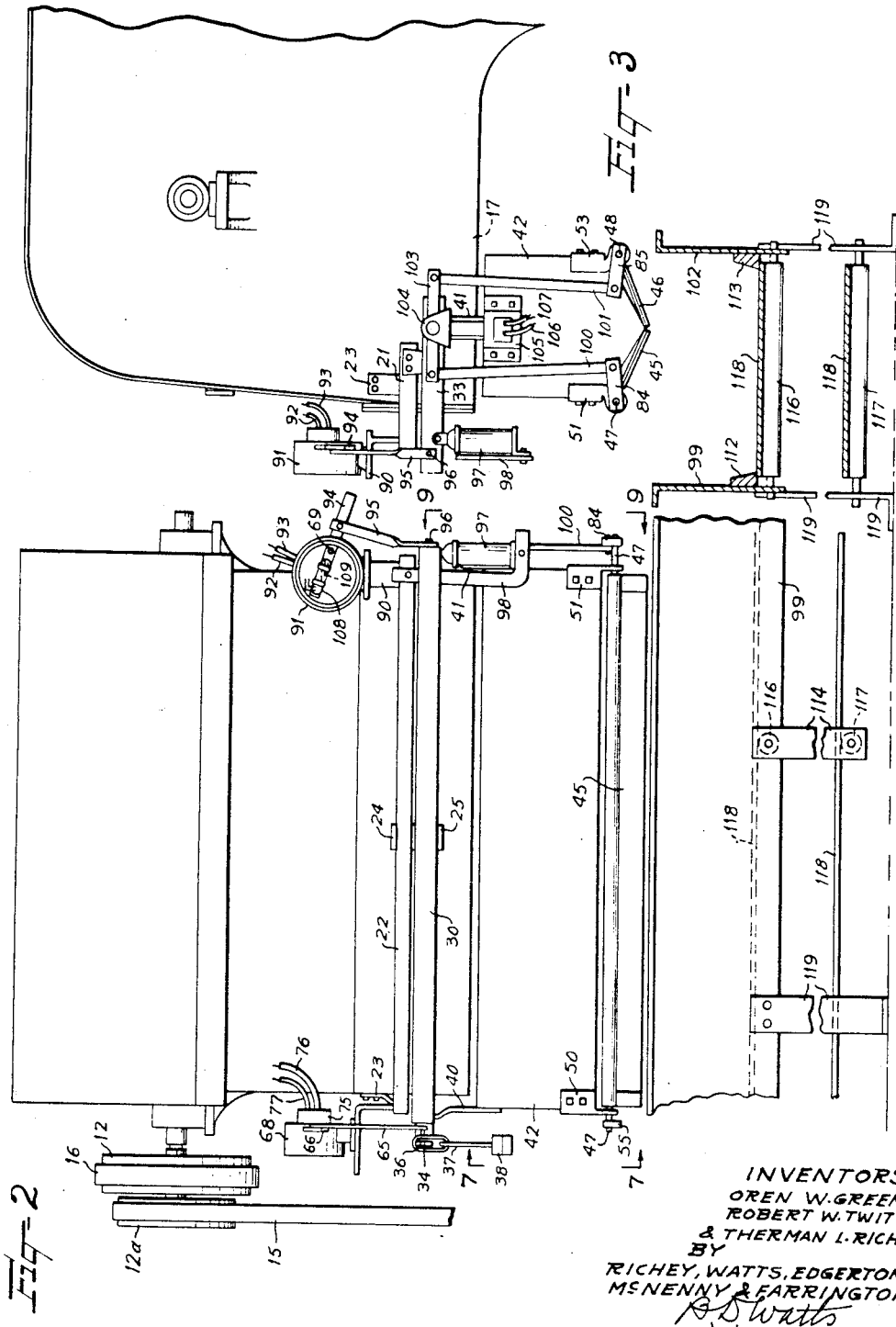

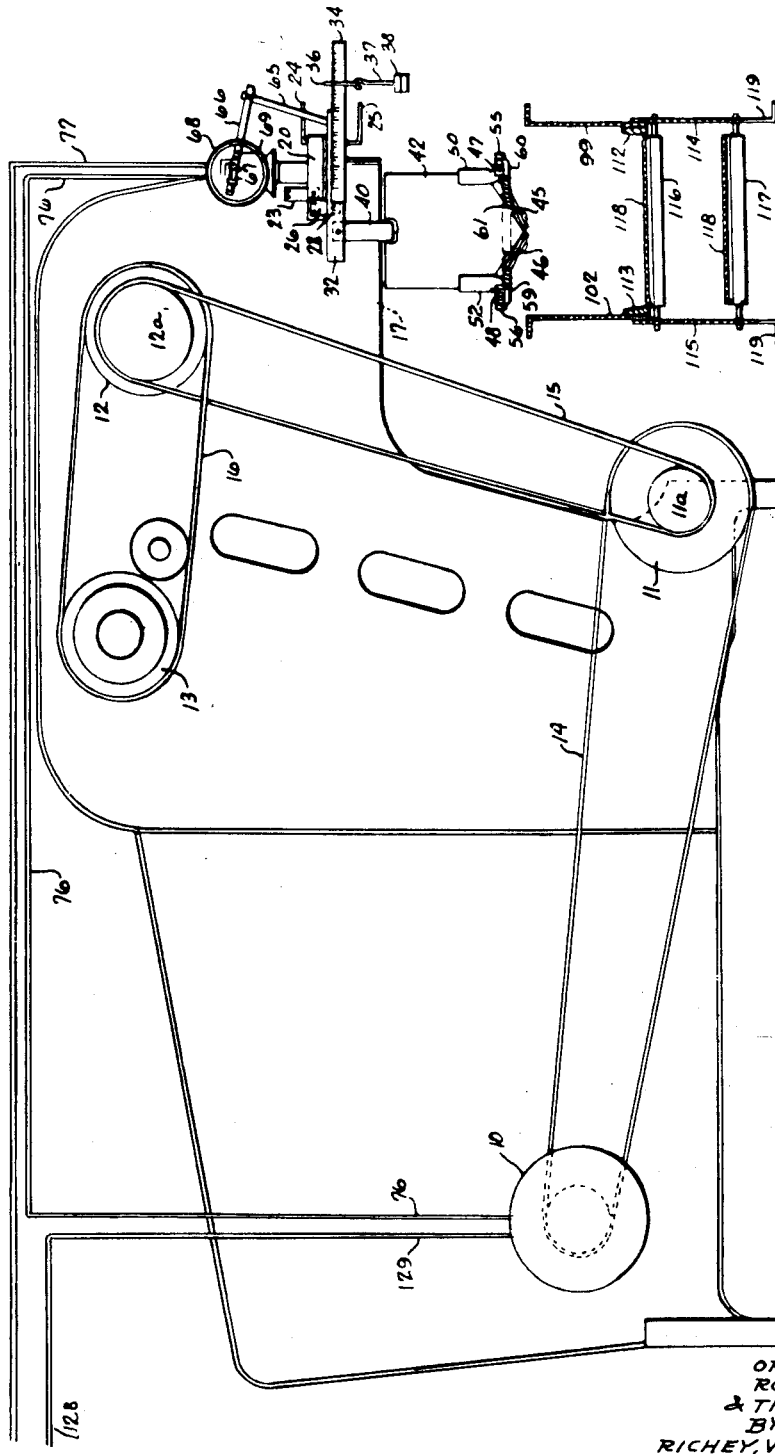

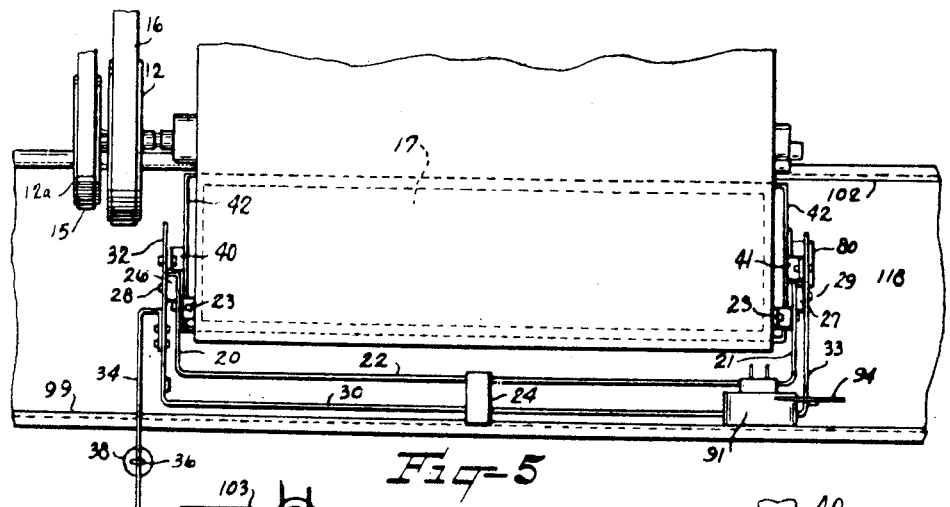
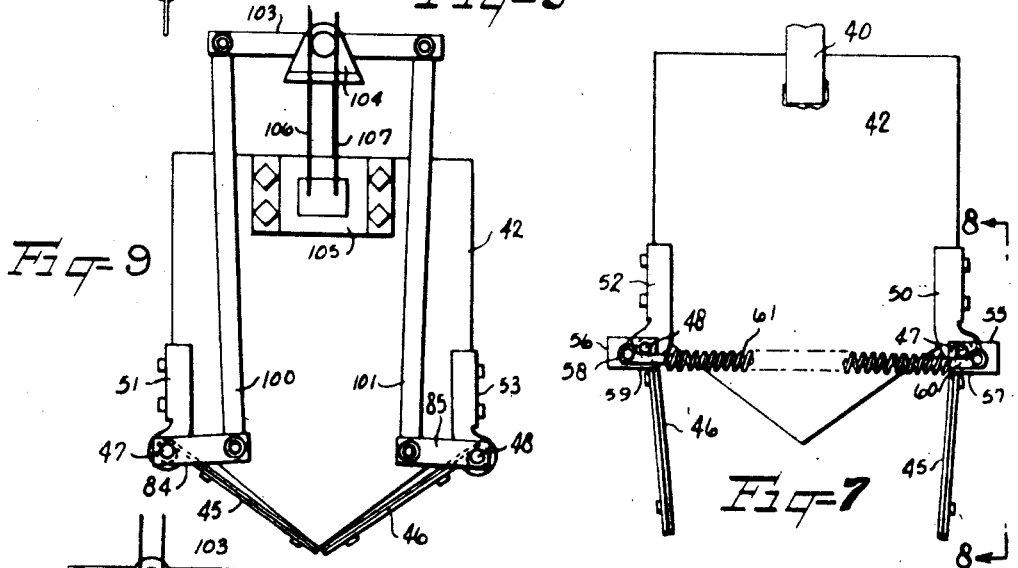
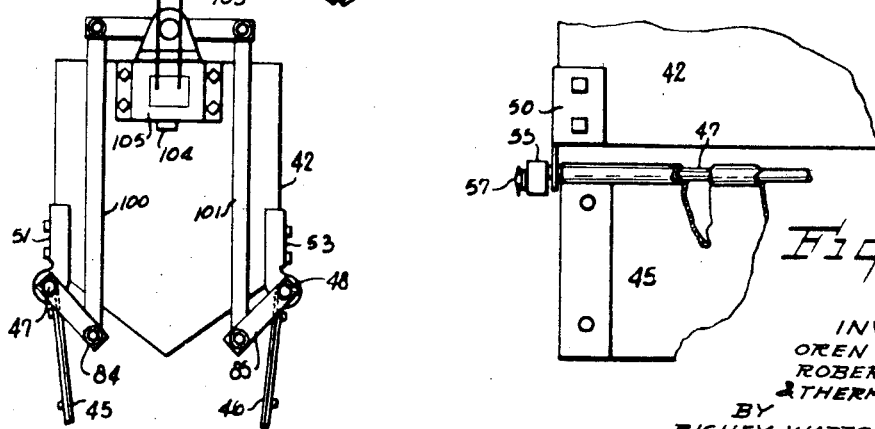

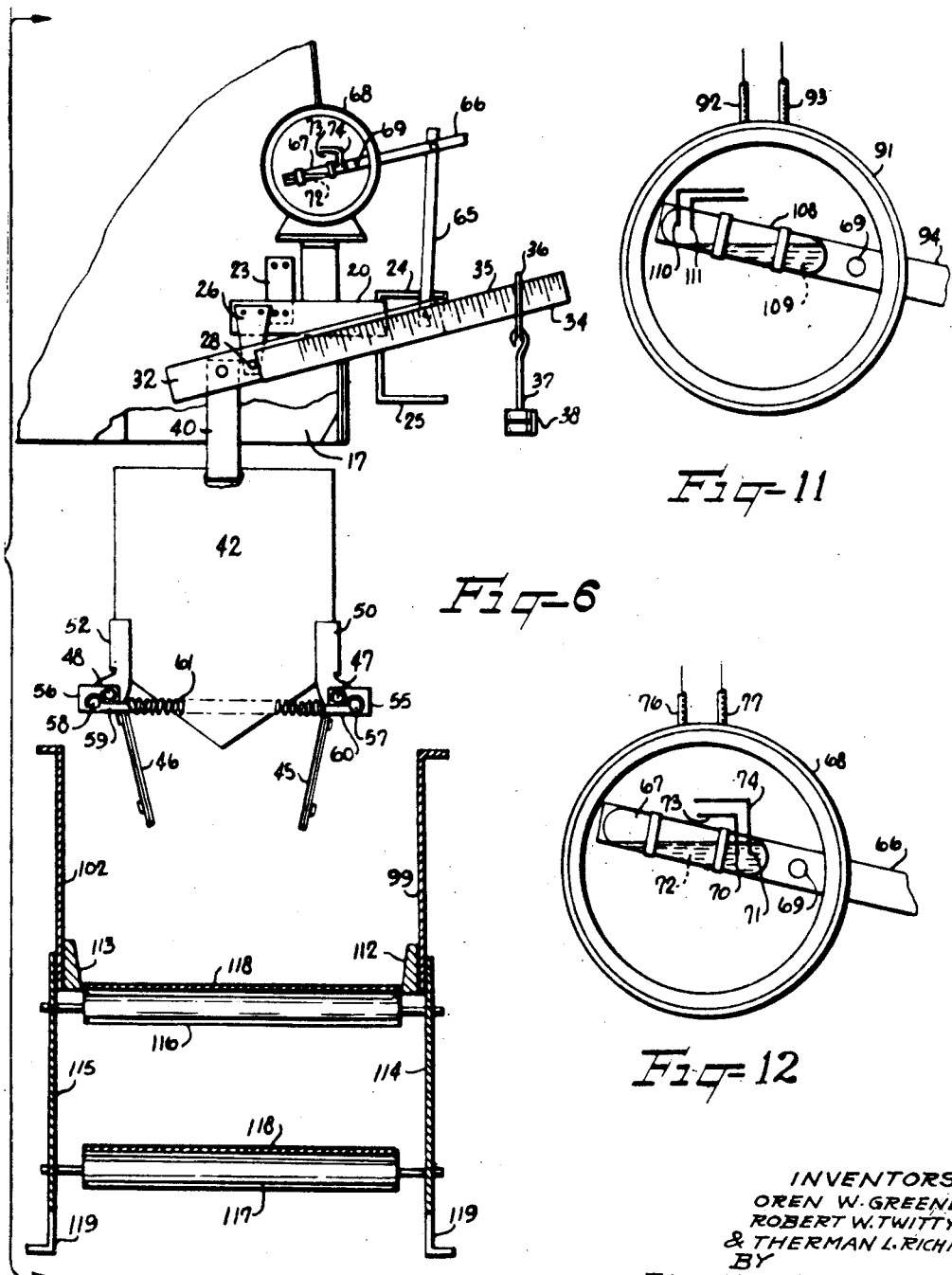

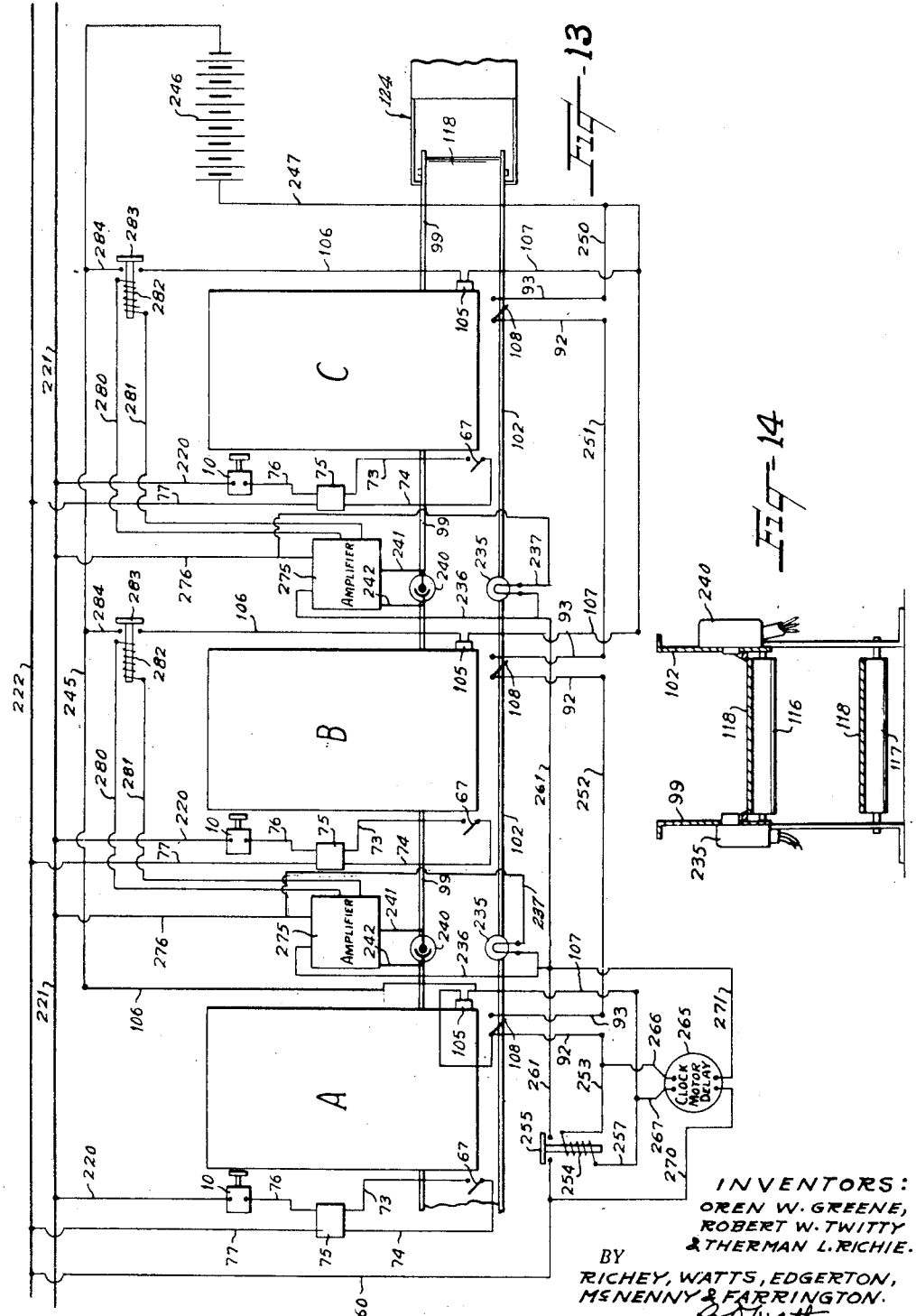

United States Patent Office 3,073,402
Patented Jan. 15, 1963

3,073,402
PHOTOELECTRICALLY CONTROLLED APPARATUS AND METHOD FOR BLENDING FIBRES
Oren W. Greene, Robert W. Twitty, and Therman L. Richie, Marion, N.C., assignors, by mesne assignments, to Crompton & Knowles Corporation, Worcester, Mass., a corporation of Massachusetts
Filed June 8, 1953, Ser. No. 360,206
10 Claims. (Cl. 177—80)

This invention relates to a method and apparatus for the blending of fibres and more especially to the combination with a plurality of fibre preparation machines, which are adapted to deliver quantities of fibres onto a common conveyor, of means for automatically delivering batches of fibres from each of the fibre preparation machines on top of each other or in superposed relation to each other in the form of a sandwich at which time all of the fibres processed by the various fibre preparation machines are fed, simultaneously, into a suitable machine for mixing and blending the various fibres thus delivered.

It is an object of this invention to provide apparatus for processing fibres, such as a plurality of feeders having means for catching the fibres processed by each of the feeders and holding the fibres and stopping any one of the feeders independently of the others when a predetermined poundage of fibres have been processed by a particular feeder, as a result of which all of the feeders will process a predetermined poundage of fibres independently of each other and will hold the fibres thus prepared until all of the feeders have stopped automatically, all of which is clearly shown and described in our U.S. Patent No. 2,412,506 of December 10, 1946. This application is a continuation in part of our patent application, Serial Number 89,942, filed April 27, 1949, now Patent No. 2,703,438, issued March 8, 1955.

It is another object of this invention to provide a plurality of fibre preparation machines adapted to deliver certain poundages of fibres onto a common conveyor, with means for automatically stopping each machine when a predetermined poundage of fibres has been processed and holding the fibres ready for delivery to the conveyor and continuing operation of the other machines until each of the machines has processed a predetermined poundage of fibres, at which time the fibres processed by the first of the preparation machines are dumped onto the conveyor. There is also provided an automatic switch closing means on the conveyor which will be energized as the fibres from the first machine pass adjacent the second of the machines to thus cause the fibres processed by the second of the machines to be dumped onto the fibres from the first of the machines, and so on, until the fibres from all of the machines have been dumped onto each other in the form of a sandwich. The conveyor then carries the sandwich of fibres into a suitable blending machine or the like for mixing the same and to thereby blend the fibres into a common lot of fibres.

Some of the objects of the invention having been stated, other objects will appear as the description proceeds when taken in connection with the accompanying drawings, in which—

FIGURE 1 is a front elevation showing a plurality of feeders with common conveyor means for receiving the fibres processed by the feeders and the said conveyor having a portion of the invention applied thereto;

FIGURE 1-A is an enlarged detail of the left-hand portion of FIGURE 1;

FIGURE 2 is an enlarged front elevation of one of the feeders and a portion of the conveyor as shown in FIGURE 1 and FIGURE 1-A;

FIGURE 3 is an elevation looking at the right-hand end of FIGURE 2 with parts broken away and showing the conveyor in vertical cross-section;

FIGURE 4 is an elevation of the feeder looking at the left-hand end of FIGURE 1, and showing the conveyor in vertical section and taken substantially along the line 4—4 in FIGURE 1;

FIGURE 5 is a top plan view showing a portion of one of the feeders as it extends above the conveyor and showing the special apparatus connected thereto which is adapted to cooperate with the present invention;

FIGURE 6 is an enlarged view similar to the right-hand portion of FIGURE 4, but showing the fibre receiving container in lowered and opened position, and showing other cooperating parts in a different position;

FIGURE 7 is an enlarged view of the fibre receiving container shown in FIGURE 6 and also looking along the line 7—7 in FIGURE 2;

FIGURE 8 is a detailed view of the lower portion of FIGURE 7 and looking along the line 8—8 in FIGURE 7;

FIGURE 9 is a view showing the opposite end of the container from that shown in FIGURE 7 and is an enlarged elevation taken along the line 9—9 in FIGURE 2 and showing a solenoid and the linkage connected thereto for controlling the opening and closing of the bottom doors or closures of the fibre receiving container;

FIGURE 10 is a view similar to FIGURE 9, on a reduced scale, and showing the solenoid energized to open the bottom doors of the fibre receiving container;

FIGURE 11 is an enlarged elevation of the right-hand central portion of FIGURE 2 and showing a type of mercury switch employed in the solenoid circuit for controlling the electric motors which drive the feeders;

FIGURE 12 is an enlarged elevation of the right-hand central portion of FIGURE 4 and showing the mercury switch for energizing the solenoid which controls the opening of the bottom doors of the fibre receiving container;

FIGURE 13 is a wiring diagram of the apparatus;

FIGURE 14 is an enlarged vertical sectional view through the horizontal portion of the conveyor showing the manner in which the photo-electric cells and light sources are mounted in the conveyor side walls and being taken substantially along the line 14—14 in FIGURE 1-A.

Referring more specifically to the drawings, the reference characters A, B and C represent a plurality of fibre preparation machines, such as what are commonly known as feeders, and which disintegrate the fibres after they have passed through the bale-breakers and the like. The fibres are then passed to a blending machine or cleaner or other fibre preparation machines, to be delivered to the pickers in the picking room. These feeders are identical to each other and a brief description of one will be sufficient for the others.

Each of the feeders has an electric motor 10 for driving the same, each feeder having a plurality of pulleys 11, 11a, 12, 12a, and 13 which are connected together by belts 14, 15 and 16 which drive conventional fibre handling mechanism, not shown, disposed within the feeder housing and also drive conventional elevating mechanism, not shown, for elevating the disintegrated fibres and dropping them down through a discharge opening 17 of the feeder to suitable conveying apparatus.

To facilitate operation of the present invention, it is necessary that the fibres be prevented from falling directly onto a suitable conveying apparatus. A structure such as that shown in our Patent Number 2,412,506, of December 10, 1946, and in our said co-pending application, is employed to hold and weigh the fibres as they drop through the discharge opening 17 of the feeder, so a predetermined weight of fibres can be collected into a suitable fibre receiving container and held there, and when a predetermined weight has been received, the feeder will automatically be stopped and the other feeders will continue operation until all of the fibre receiving containers disposed below the discharge openings of the feeders shall have received a predetermined weight, at which time the bottoms of the fibre receiving containers will be opened successively to discharge all of the contents of all of the fibre receiving containers on top of each other onto a suitable conveying mechanism to convey the fibres to the blending mechanism.

In the invention, to be later described, the feeder, which may be any one of the feeders A, B and C will automatically be stopped when a predetermined weight has been received in the fibre receiving container and the other feeders will continue operation until all of the fibre receiving containers have received their predetermined weights of fibre. However, when all of the containers have received such weights, the bottom of the fibre receiving container on feeder A will be opened to discharge its contents onto the conveyor mechanism and as the contents of the container from the first feeder A pass beneath the fibre receiving container of the second feeder B the contents from the container on feeder B will be discharged onto the contents from feeder A and then as the contents from feeders A and B pass beneath the container for the feeder C, the contents from this last fibre receiving container will be discharged onto the contents from the feeders A and B, as a result of which the contents from the feeders A, B and C will be delivered to a succeeding processing machine, such as a blender or the like with the batches from each of the machines A, B and C being disposed in superposed relation to each other or in sandwich form.

Rigidly secured to the ends of the outer side walls of the discharge portion of each feeder are legs 20 and 21 of a U-shaped member 22, these being riveted to a suitable bar 23 which is, in turn, riveted to the side walls of the feeder. This U-shaped member 22 has outwardly projecting stops 24 and 25 (FIGURES 1, 2, 4 and 5) secured thereto for purposes to be later described. Downwardly and outwardly projecting members 26 and 27 are secured to the legs 20 and 21 of the U-shaped member 22 and have pivotally secured thereto, as at 28 and 29, legs 32 and 33, respectively, of a second U-shaped member 30 which is disposed at a slightly lower elevation than the U-shaped member 22 in FIGURE 4.

Fixedly secured to the leg 32 is a weight lever 34 (FIGURES 4 and 6) which is adapted to receive a ring member 36 having a knife edge adapted to fit into conventional notches in the upper edge of the weight lever 34 (FIGURES 4 and 6). The member 36 has a hooked weight member 37 adapted to be hooked in the ring 36 and one or more weights 38 may be placed thereon to cause it to hold a proper amount of weight within the fibre container to be presently described. The stops 24 and 25, as previously described, are engaged by the member 30 in its up and down movement to limit swinging movement of the member 30 (FIGURE 6).

Pivotally secured to the leg portions 32 and 33 of the U-shaped member 30 are depending links 40 and 41, respectively, which have their lower ends rigidly secured to a fibre receiving container 42 (FIGURES 2, 5, 6 and 7). This container 42 is over-balanced on the pivot 28 by the addition of suitable weights to the hooked member 37 (FIGURES 4 and 6) so that it will take a predetermined number of pounds and ounces of fibres in the container 42 to swing the U-shaped member 30 on its pivot against the weight applied to the member 37.

The upper end of the container 42 is open and is adapted to receive fibres falling from the feeder discharge opening 17. The lower end of the container 42 is closed by a pair of swinging doors or closure members 45 and 46 whose upper ends are curled around and fixed to rods 47 and 48, respectively, which are pivotally mounted in brackets 50 and 51 and 52 and 53, respectively (FIGURES 6 to 10, inclusive).

Referring to FIGURES 4, 6, 7 and 8, it may be observed that there is disposed at the end of the container 42 which has the weight lever 34 associated therewith, short arms 55 and 56 which are connected to the ends of the rods 47 and 48, respectively, and in which pins 57 and 58 are mounted. To these pins 57 and 58 are pivotally connected short links 59 and 60 to the proximate ends of which the ends of a tension spring 61 are connected.

The spring 61 normally has a tendency to pull the bottom closures 45 and 46 to closed position at all times, and the tension in this spring 61 is sufficient to hold the bottom closures 45 and 46 in closed position, although the container 42 may be completely filled with fibres from the feeder. The spring 61 also holds a solenoid plunger, to be later described, in a raised position and when the solenoid is energized, it will overcome the tension in the tension spring 61 and will open the closures 45 and 46 as observed in FIGURES 6, 7 and 10.

Pivoted to the U-shaped member 30 is the lower end of a link 65 (FIGURES 4 and 6) which is pivoted at its upper end to an arm 66 on which is mounted a conventional mercury switch bulb 67 for controlling the electric motor 10 as will be later described. The bulb 67 is disposed within a conventional housing 68. The arm 66 is pivotally connected as at 69 to the conventional housing 68. The bulb 67 has a pair of contacts 70 and 71 (FIGURE 12) disposed on the interior of the bulb and adapted to be surrounded by a quantity of mercury 72 when the lever 66 is in the position shown in FIGURE 12. Wires 73 and 74 are connected to the contacts 70 and 71, respectively, and lead to a conventional junction box 75 (FIGURE 2) and from this box wires 76 and 77 extend.

When the container 42 receives a predetermined amount of poundage of fibres, it will be moved downwardly from the position shown in FIGURE 4 to the position shown in FIGURE 6 and will thus break the circuit to the electric motor 10, due to the fact that the right-hand end of the arm 66 will be moved upwardly as shown in FIGURE 6, thus causing the mercury to move out of contact with the contacts 70 and 71 in the bulb 67. The motor circuit will be later described.

On the end of the container 42 opposite from the end which has just been described, there is disposed a pair of arms 84 and 85 which are fixedly secured on the other ends of the rods 47 and 48 previously described. The arms 84 and 85 have vertically disposed links 100 and 101, respectively, pivotally connected thereto which, at their upper ends, are connected to a cross bar 103.

This cross bar 103 is pivotally connected to a core 104 of a solenoid 105 having wires 106 and 107 leading therefrom and being connected to other parts of the electrical circuit to be later described. The solenoid 105 is suitably secured to the end of the container 42. The wires 106 and 107 are connected through intervening wires to a mercury switch bulb 108 (FIGURE 11) having liquid mercury 109 therein and which controls the opening of the closures 45 and 46 in the bottom of the container 42 in a manner to be later described. The mercury switch bulb 108 is disposed within a conventional housing 91 mounted on a bracket 90 on the U-shaped member 22 (FIGURE 2). This mercury switch housing 91 and its associated parts is identical to the mercury switch 67 previously described for the electric motor 10, except its ends are reversed on its lever 94 and during the time that the fibres are being fed into the container 42, the mercury switch bulb 108 in the housing 91 occupies the position shown in FIGURE 11.

The mercury switch bulb 108 is mounted on a lever 94 and has a link 95 connected thereto which is pivotally connected as at 96 to the leg 33 of the U-shaped member 30. Also mounted on the leg 33 is a conventional dash-pot 97 to which is connected a link 98 which is connected to the leg 21 of the member 22 which is fixedly secured to the discharge portion of the feeder. This dashpot is a conventional mechanism and merely slows down the swinging movement of the member 30 and associated parts.

It will be noted that the above described mechanism refers to the normally de-energized solenoid circuit employed in the Patent Number 2,412,506. It will be noted that the bulb 108 in FIGURE 11 has contacts 110, and 111 therein which are normally out of contact with the mercury 109 disposed within the mercury tube or bulb 108 when the parts are in the position shown in FIGURE 9, for example. The contacts 110 and 111 are connected to wires 92 and 93, respectively, which extend from the housing 91 (FIGURE 11) and are connected at their other ends to the electrical circuit to be later described. As the fibres are deposited in the container 42 it will move downwardly very gradually until the predetermined amount of fibres have been deposited in the container 42. The container 42 will then have moved the lever 94 (FIGURE 2) upwardly sufficiently to cause the mercury 109 therein to contact the points 110 and 111 to be ready to energize the solenoid 105 and to forcibly open the closure members 45 and 46 to dump the contents from the container 42 inasmuch as the solenoid 105 will overcome the tension in the tension spring 61. However, it will be readily understood, upon the electrical circuit shown in FIGURE 13 being fully described, that the solenoid 105 will not be energized by the mercury 109 moving into engagement with the contacts 110 and 111 in FIGURE 11 until a batch of fibres is about ready to pass below a particular hopper.

For example, the container 42 associated with feeder A might be set to move downwardly at 4 pounds, while container 42 of feeder B would be set to move downwardly at 6 pounds, and the container associated with feeder C would be set to move downwardly at 8 pounds. When this downward movement of the containers took place, the motor 10 for the particular feeder would be stopped when the predetermined amount of fibres will have been deposited in its receiving container, but the solenoid 105 associated with the discharging of the contents from the container, for allowing the opening of the bottom closure members 45 and 46, would not function for the reason that this will not take place until all of the containers have been charged to the predetermined amount of fibres to be placed therein according to weight.

Any suitable means may be provided for conveying the discharged fibres from the containers 42 to another fibre treating apparatus. An elongated continuous conveyor is shown in the drawings as being provided for this purpose. This conveyor comprises an elongated trough having side walls 99 and 102 with slats 112 and 113 disposed near the bottom inner side portions thereof. The walls 99 and 102 are supported by legs 119. The side walls 99 and 102 have a plurality of brackets 114 and 115 in which upper rollers 116 are mounted and also lower rollers 117. The upper rollers 116 are designed to support the upper reach of the horizontal portion of an endless belt 118 and the lower rollers 117 are provided to support the lower reach of the horizontal portion of the belt 118. This belt at its ends is mounted on rollers 120 and 121 and roller 121 is driven by a suitable belt 122 driven by a motor 123 to discharge the dumped fibres into the fibre preparation machine 124 which may be a suitable cleaner or blending machine or any other suitable fibre treating apparatus. This fibre treating apparatus 124 is operated on call from the picker room and likewise, the feeders are operated on calls from the fibre preparation machine 124 to supply the necessary amount of fibres to the picker room.

Referring to FIGURES 13 and 14, there may be observed the wiring diagram of the invention by means of which the batches of fibres from the machines A, B and C may be delivered to a blender 124 or the like in superposed or stacked relation without the necessity of the hopper 160 in said co-pending application being employed.

In this form of the invention, the structure and operation of the feeders A, B and C is identical to that form of the invention shown in our said co-pending application. However, the circuit shown in FIGURE 13 is arranged so that all of the containers 42 associated with the feeders A, B and C will be filled to their predetermined weight, which will automatically stop the motors 10 in the manner heretofore described, and then, instead of all of the feeders A, B and C dumping the contents from their containers 42 simultaneously, the contents from the containers associated with the machine A will be dumped onto the conveyor and then as the contents from the container associated with the feeder A pass beneath the container 42 associated with feeder B, the contents from the container 42 of feeder B will be dumped on top of the contents from the container associated with feeder A.

The contents from the containers 42 associated with both of the feeders A and B will then move beneath the container 42 associated with the feeder C and the contents from the container 42 of feeder C will be dumped onto the contents from the containers 42 associated with the feeders A and B. Thus, the contents from all of the feeders will be delivered in superposed relation, simultaneously, to a blender, superior cleaner or the like, to thus produce a uniform blending or cleaning of the fibres.

It may be observed in FIGURES 1, 13 and 14 that the side wall 99 of the conveyor is provided with a plurality of spaced incandescent lamps 235, only the brackets for the lamps 235 being shown in FIGURES 1 and 14, while the lamps 235 are represented in FIGURE 13 by the adopted symbol as shown in the Rules of Practice of the United States Patent Office. These lamps 235 have wires 236 and 237 extending therefrom which are connected to other parts of the electrical circuit to be presently described.

Mounted in the side wall 102 of the conveyor in alinement with each of the lamps 235, is a photoelectric cell or selenium or other switch mechanism which is responsive to light rays and which is indicated at 240 in FIGURE 13. Only the housing of the photoelectric cell 240 is shown in FIGURE 14 and this photoelectric cell 240 has electric wires 241 and 242 extending therefrom which are also connected to the electrical circuit to be later described. It will be noted that there is one of the incandescent lamps 235 and a cooperating photoelectrical cell 240 disposed between each of the feeders for purposes to be later described. Referring again to FIGURE 13, there may be observed the electrical circuit for the motor 10 for each of the feeders and it will be noted that it is the same as that described for the motors 10 in FIGURE 16 of said co-pending application, and therefore a further description of the motor circuit shown in FIGURE 13 will not be given.

In the wiring diagram shown in FIGURE 13, the switches 108 are normally de-energized as is the case with the switches 108 in the wiring diagram shown in FIGURE 16 in said co-pending application. However, in this case, by referring to FIGURE 13, it will be seen that the wire 106 from the solenoid 105 associated with the feeder A only is connected at its other end to a common lead wire 245 which extends to the minus side of a source of electrical energy, such as a storage battery 246. A lead wire 247 extends from the plus side of the storage battery 246 and has the wires 107 from the solenoids 105 associated with the feeders B and C only connected thereto and also has an electric wire 250 connected thereto, the other end of which is connected to the free end of the wire 93 of the switch 108 associated with the feeder C.

The free end of the wire 92 from the feeder C is connected to one end of a wire 251, the other end of which is connected to the wire 93 associated with the feeder B. A wire 252 is connected at one end to the wire 92 from the feeder B and at its other end to the wire 93 which extends to the feeder A. A wire 253 extends from the wire 92 associated with feeder A and is connected at its other end to a relay coil 254 which controls a relay switch 255. The other side of the relay coil 254 is connected to a wire 257 which is connected to the free end of the wire 107 from the solenoid 105 associated with the feeder A. A wire 260 extends from the lead wire 222 to the relay switch 255 and the other side of the relay switch 255 has a wire 261 extending therefrom to which wires 236 from the incandescent lamps 235 are connected.

It is thus seen that upon all of the switches 108 being closed in the manner heretofore described, as the associated containers 42 are filled to a predetermined weight, the circuit will be completed to the relay coil 254 and to the solenoid 105 associated with the feeder A simultaneously, as a result of which the contents of the container 42 associated with the feeder A will be dumped onto the conveyor belt 118 at the same time that a circuit is completed to the incandescent lamps 235 and the photoelectric cells 240 in a manner to be presently described.

Now, immediately upon the contents of the container 42 associated with the feeder A being discharged from the container 42, it is manifest that the container 42 will move upwardly which will automatically open the switch 108 associated therewith. This, of course, would cause the relay coil 254 to be de-energized with the result that the relay switch 255 would open and this would stop the flow of electrical energy to the incandescent lamps 235 and the amplifier for the photoelectric cells 240. Therefore, there is provided a clock motor delay 265 having wires 266 and 267 extending therefrom, the other ends of which are connected to the wires 253 and 257, respectively. Thus, upon the switch 108 being closed, in the manner heretofore described, the clock motor delay will be wound sufficiently to complete a circuit for a predetermined length of time between electric wires 270 and 271, which extend from the clock motor delay 265 and are connected at their other ends to the wires 260 and 261, respectively. It is thus seen that upon the switch 108 being opened, after the contents from the container 42 have been discharged, the circuit to the incandescent lamps 235 will be continued for a predetermined length of time until the clock motor delay 265 has unwound.

The clock motor delay is a commercial item and is shown in the patent to Richard R. Cone, Number 2,444,553 of July 6, 1948, in which reference is made to patents numbered 1,977,184; 1,977,185; 1,977,186; 1,935,208; 1,996,375; 2,353,305 and 2,049,261 for a full disclosure of the clock motor delay.

There are many types of time delay relays which are adapted to operate after de-energization and which may supplement the clock motor delay 265. One type of time delay relay which may be employed is manufactured by Square D Company, Industrial Controller Division, Milwaukee, 12, Wisconsin, and is known as a class 9050 pneumatic timer and is illustrated in Sweet's File for Product Designers for the year 1946 on page 3b/11.

Each of the wires 236 extending from the incandescent lamps 235 is connected at its other end to an amplifier 275 to which the wires 241 and 242 from each of the photoelectric cells 240 are also connected. The amplifier 275 has an electric wire 276 extending therefrom and being connected at its other end to the lead wire 221 to thus complete an electrical circuit to the amplifier upon the switch 108 associated with the feeder A being closed, and the circuit through the clock 265 and the switch 255 being closed.

The amplifier also has electric wires 280 and 281 extending therefrom, the other ends of which are connected to opposite ends of a relay coil 282 which controls a relay switch 283. The amplifiers 275 are of a type such as that described in the patent to Buford L. Green, Number 2,067,182; or such as is manufactured by General Electric Company, Schenectady, N.Y., under their number 9TY51A1 and which is shown in the said Sweet's File for Product Designers on page 3a/8.

It will be noted in FIGURE 13 that the wires 106 from the solenoids 105 associated with the feeders B and C are connected to one side of the switches 283 and each of the switches 283 has a wire 284 extending from the other side thereof which is connected at its other end to the common wire 245 heretofore described.

The incandescent lamps 235 and the photoelectric cells 240 are positioned along the conveyor according to the speed at which the upper reach of the conveyor belt 118 moves past the feeders A, B and C so that upon the contents of the container 42 from the feeder A falling onto the conveyor belt 118, the contents from the first feeder A will move between the first of the incandescent lamps 235 and its associated photoelectric cell 240 which will be positioned so that the contents from the container 42 associated with the feeder B will fall onto the contents from the container 42 associated with the feeder A.

It will be noted that upon a batch of fibres moving from the first machine A between the incandescent lamp 235 and the photoelectric cell 240, conventional means, not shown, within the amplifier 275 will complete a circuit to the relay coil 282 through the wires 280 and 281 and the wires 276 and 236, as a result of which the relay switch 283 will be closed, thus completing a circuit from the minus side of the battery 246, through the wires 245 and 284, switch 283 and wire 106 to the solenoid 105 associated with the feeder B.

The closure members 45 and 46 associated with the container 42 on the feeder B will then be opened, inasmuch as the current will flow from one side of the solenoid 105 through the wires 107 and 247 to the other side of the battery 246. As the closure members 45 and 46 of feeder B open, the batch of fibres from feeder A will pass beneath them so the batch of fibres from feeder B will fall onto the batch from feeder A. The incandescent lamp 235 and the photoelectric cell 240 between the feeders B and C will effect the operation of the opening of the container doors 45 and 46 of feeder C in the same manner as that for the feeder B, after the contents from the containers 42 associated with the feeders A and B will have moved therebetween, and it is thus seen that the contents from all of the containers 42 will move off the right-hand end portion of the conveyor belt in FIGURE 13, in sandwich form, simultaneously into a suitable blender or the like.

The foregoing specification emphasizes certain inherent outstanding features of the present invention. The fibers may be weighed with a high degree of accuracy and in amounts of as little as a few ounces because of the simplicity of the several machines, particularly as regards the scale mechanism. The weight lever or scale beam 34 is pivoted by the weight of the fibers when the amount thereof received in the container 42 is equivalent to the predetermined weight; and this movement is not appreciably impeded by the actuation of the mercury switches which are actuated by the scale beam.

Moreover, maintenance of the predetermined percentages of the several different fibers during prolonged operation of the apparatus is insured by the provision of apparatus which prevents the discharge of fibers from any of the fiber-receiving containers in the event that less than the predetermined amount of fiber is weighed in any of those containers.

Furthermore, the sandwiching of batches of fibers in which the predetermined percentages are maintained insures uniformity of mixture of the several fibers during the mixing operation.

Having thus described the present invention so that others skilled in the art may be able to understand and practice the same, we state that what we desire to secure by Letters Patent is defined in what is claimed.

We claim:

1. Apparatus for use in proportioning different fibers to be blended comprising a plurality of machines for feeding, weighing and discharging predetermined amounts of each of a plurality of fibers in successive batches, each of said machines including a fiber feeder and scale means including a receptacle disposed to receive and weigh fibers delivered by said feeder, an endless fiber conveyor common to and movable beneath the receptacles of said machines, means to deliver fibers from the receptacles, said means including an electrical circuit, solenoids in said circuit and operatively associated, respectively, with the several said weighing receptacles to open them for discharge of batches of fibers therefrom, photoelectric means positioned for actuation by fibers on said conveyor to energize certain of said solenoids successively for discharge of the batches of fibers from the receptacles in successive layers on one another on the conveyor, and time-delay means for controlling the duration of energization of said certain solenoids upon the approach of a batch of fibers discharged from a preceding machine, and means to insure maintenance of the predetermined percentages of the several different fibers in successive batches including switches for each of the several machines actuatable by movement of the respective scale means after the predetermined amount of fiber has been weighed thereby and connectible in series in said circuit, said switches serving to maintain said solenoids de-energized when less than the predetermined amount of any of the several fibers has been weighed.

2. Apparatus for use in proportioning different fibers to be blended comprising a plurality of machines for feeding, weighing and discharging predetermined amounts of each of a plurality of fibers in successive batches, each of said machines including a fiber feeder and scale means including a receptacle disposed to receive and weigh fibers delivered by said feeder, an endless fiber conveyor common to and movable beneath the receptacles of said machines, automatic means to deliver fibers from the receptacles in superposed layers onto the conveyor, said means including an electrical circuit, solenoids in said circuit and operatively associated, respectively, with the several said weighing receptacles to open them for discharge of batches of fibers therefrom, and means automatically actuated in timed relation to the movement of the conveyor when there is a batch of fibers on the conveyor to energize certain of said solenoids successively and deposit the batches of fibers from the receptacles in sandwich layers on the conveyor while it is moving, and means to insure maintenance of the predetermined percentages of the several different fibers in successive batches including switches for each of the several machines actuatable by movement of the respective scale means after the predetermined amount of fiber has been weighed thereby and connectible in series in said circuit, said switches serving to maintain said solenoids de-energized when less than the predetermined amount of any of the several fibers has been weighed.

3. Apparatus for use in proportioning different fibers to be blended comprising a conveyor, a plurality of machines for feeding, weighing and discharging predetermined amounts of each of a plurality of fibers in successive batches, each of said machines including a fiber feeder and scale means including a receptacle disposed to receive and weigh fibers delivered by said feeder, automatic means to discharge a weighed batch of fibers from each of the receptacles, said means including an electrical circuit cooperating with the conveyor and said receptacles for delivering the batches of fibers from the latter onto one another in superposed layers on the conveyor while it is moving, said conveyor serving to transport such layers, and means to insure maintenance of the predetermined percentages of the several different fibers in similar successive batches, said means including an electrical circuit and switches for each of the several machines actuatable by movement of the respective scale means after the predetermined amount of fiber has been weighed thereby, said switches serving to maintain the fiber delivering circuit de-energized when less than the predetermined amount of any of the several fibers has been weighed.

4. Apparatus for use in proportioning different fibers to be blended comprising a movable conveyor, a plurality of machines for feeding, weighing and discharging predetermined amounts of each of a plurality of fibers in successive batches, each of said machines including a fiber feeder and scale means including a receptacle disposed to receive and weigh fibers delivered by said feeder, automatic means to discharge weighed batches of fibers from the receptacles, said means including an electrical circuit cooperating with the movable conveyor and said receptacles for delivering the batches of fibers from the latter onto one another in superposed layers on the conveyor while it is moving, said conveyor serving to transport such layers and means to insure maintenance of the predetermined percentages of the several different fibers in similar successive batches, said means including an electrical circuit which is operative to maintain the receptacle-discharging means de-energized when less than the predetermined amount of any of the several fibers has been weighed.

5. Apparatus for use in proportioning different fibers to be blended comprising a plurality of machines for feeding, weighing and discharging predetermined amounts of each of a plurality of fibers in successive batches, a movable conveyor for receiving said batches, each of said machines including a fiber feeder and scale means including a receptacle disposed to receive and weigh fibers delivered by said feeder, automatic means to discharge weighed batches of fibers from the receptacles, said means including an electrical circuit cooperating with said movable conveyor and said receptacles for delivering the batches of fibers from the latter onto one another in superposed layers on the conveyor while it is moving, said conveyor serving to transport such layers and means to insure maintenance of the predetermined percentages of the several different fibers in similar successive batches, said means including an electrical circuit which is operative to render inoperative the receptacle-discharging means when less than the predetermined amount of any of the several fibers has been weighed.

6. Apparatus for use in proportioning different fibers to be blended comprising a plurality of machines each for concurrently feeding and weighing and thereafter discharging predetermined amounts of one of said different fibers in successive batches, (a) a movable conveyor for receiving said batches,
(b) each of said machines including a fiber feeder and scale means including a receptacle disposed to receive and weigh fibers delivered by said feeder,
(c) automatic means to discharge weighed batches of fibers from the several receptacles after each receptacle has received its batch, said means including an electrical circuit cooperating with said movable conveyor and said receptacles for delivering batches of fibers from the latter onto one another in superposed layers on the conveyor, said conveyor serving to transport such layers,
(d) and means to insure maintenance of the predetermined percentages of the several different fibers in similar successive batches, said means including an electrical circuit which is operative to render the receptacle-discharging means inoperative when less than the predetermined amount of any of the several fibers has been weighed.

7. Apparatus for use in proportioning different fibers to be blended comprising a plurality of machines for feeding, weighing and discharging predetermined amounts of each of a plurality of fibers in successive batches, (a) a movable conveyor for receiving said batches,
(b) each of said machines including a fiber feeder and scale means including a receptacle disposed to receive and weigh fibers delivered by said feeder, (c) automatic means to discharge weighed batches of fibers from the receptacles, said means including an electrical circuit responsive to predetermined movement by the conveyor of a first batch from one of said receptacles and cooperating with the other receptacles for delivering batches of fibers from the latter onto one another in superposed layers on the conveyor, said conveyor serving to transport such layers, (d) and means to insure maintenance of the predetermined percentages of the several different fibers in similar successive batches, said means including an electrical circuit which is operative to render the receptacle-discharging means inoperative when less than the predetermined amount of any of the several fibers has been weighed.

8. Apparatus for use in proportioning different fibers to be blended comprising a plurality of machines each including a fiber feeder and weighing means to feed and weigh a batch of fibers consisting of a predetermined amount of one of said fibers, a receptacle disposed to receive and discharge said weighed batch of fibers and means including an electrical circuit for stopping said feeder when its receptacle has received its batch of fibers and for starting said feeder after the batch of fibers has been discharged from the receptacle, (a) a movable conveyor disposed to receive the batches of fibers discharged from the receptacles of the several machines, (b) means cooperating with the conveyor and receptacles and including an electrical circuit automatically energizable after all the receptacles have received their batches of fibers to discharge the batches of fibers from the latter onto one another in superposed layers on the conveyor for transport thereby, (c) and means to insure maintenance of the predetermined percentages of the several different fibers in successive superposed layers, said insuring means including means in said automatically energizable circuit which is operative to render the last said circuit inoperative until all the several receptacles have received their batches of fibers.

9. Apparatus for use in proportioning different fibers to be blended comprising a plurality of machines each including a fiber feeder and weighing means to feed and weigh a batch of fibers consisting of a predetermined amount of one of said fibers, a receptacle disposed to receive and discharge said batch of fibers, means including an electrical circuit for stopping said feeder when its receptacle has received its batch of fibers and for starting said feeder after the batch of fibers has been discharged from its receptacle, (a) a movable conveyor disposed to receive batches of fibers discharged from the receptacles of the several machines, (b) means cooperating with the conveyor and receptacles to discharge batches of fiber from the receptacles onto one another in superposed layers on the conveyor for transport thereby, said means including a second electrical circuit, (c) and means to insure maintenance of the predetermined percentages of the several different fibers in successive superposed layers, said insuring means including means operatively connected to said second circuit to render it inoperative until the several receptacles have received their batches of fibers.

10. Apparatus for use in proportioning different fibers to be blended comprising a plurality of machines each for concurrently feeding and weighing and thereafter discharging predetermined amounts of one of said different fibers in successive batches, (a) a movable conveyor for receiving said batches, (b) each of said machines including a fiber feeder and scale means including a receptacle disposed to receive and weigh fibers delivered by said feeder, (c) automatic means to discharge weighed batches of fibers from the several receptacles, said means including an electrical circuit cooperating with said movable conveyor and said receptacles for delivering batches of fibers from the latter onto one another in superposed layers on the conveyor, said conveyor serving to transport such layers, (d) and means to insure maintenance of the predetermined percentages of the several different fibers in similar successive batches, said means including elements responsive to said scale means and operatively connected to said electrical circuit to render the receptacle-discharging means operative when the predetermined amounts of each of the several fibers have been weighed.

References Cited in the file of this patent

UNITED STATES PATENTS

| | | |
|---|---|---|
| 1,717,430 | Young | June 18, 1929 |
| 2,019,843 | Clark | Nov. 5, 1935 |
| 2,357,475 | Kane | Sept. 5, 1944 |
| 2,412,506 | Greene | Dec. 10, 1946 |
| 2,638,305 | Miller | May 12, 1953 |